United States Patent
Matsuoka

(10) Patent No.: US 12,498,040 B2
(45) Date of Patent: Dec. 16, 2025

(54) POWER TRANSMISSION DEVICE

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 18/991,521

(22) Filed: Dec. 21, 2024

(65) Prior Publication Data

US 2025/0237306 A1 Jul. 24, 2025

(30) Foreign Application Priority Data

Jan. 19, 2024 (JP) ................................. 2024-006961

(51) Int. Cl.
*F16H 61/14* (2006.01)

(52) U.S. Cl.
CPC .................................. *F16H 61/143* (2013.01)

(58) Field of Classification Search
CPC ................. F16H 61/143; F16H 2061/145–147
See application file for complete search history.

(56) References Cited

U.S. PATENT DOCUMENTS

| | | | | |
|---|---|---|---|---|
| 6,035,989 A * | 3/2000 | Matsuoka | ............... | F16H 45/02 192/85.25 |
| 2005/0121277 A1 * | 6/2005 | Segawa | ................. | F16H 61/143 192/3.3 |
| 2013/0253785 A1 * | 9/2013 | Murasawa | ............ | B60W 10/30 701/53 |
| 2014/0151177 A1 * | 6/2014 | Legner | .................. | F16H 61/143 192/3.29 |
| 2019/0234501 A1 * | 8/2019 | Matsuoka | ............... | F16H 45/02 |

FOREIGN PATENT DOCUMENTS

JP 2011231857 A 11/2011

* cited by examiner

*Primary Examiner* — Lori Wu
(74) *Attorney, Agent, or Firm* — United IP Counselors, LLC

(57) ABSTRACT

A torque converter includes a lock-up device, an urging member, a cover, an impeller, a turbine, a first hydraulic chamber, and a second hydraulic chamber. The lock-up device includes a clutch part and a piston. The urging member urges the piston toward the clutch part. A first oil pathway communicates with the first hydraulic chamber. A second oil pathway communicates with the second hydraulic chamber. A switch is provided. In a first switch position, hydraulic oil is supplied to the first hydraulic chamber through the first oil pathway. In a second switch position, hydraulic oil is supplied to the second hydraulic chamber through the second oil pathway. The piston presses the clutch part when the hydraulic oil is supplied to an interior of the first hydraulic chamber. The piston releases the clutch part when the hydraulic oil is supplied to an interior of the second hydraulic chamber.

13 Claims, 7 Drawing Sheets

POWER TRANSMISSION DEVICE

CROSS-REFERENCE TO RELATED APPLICATIONS

This application is based on and claims the priority benefit of application 2024-006961 filed on Jan. 19, 2024, the contents of which are incorporated herein by reference.

TECHNICAL FIELD

The claimed invention relates to a power transmission device.

BACKGROUND

To enhance fuel performance, a torque converter including a lock-up device has been provided. For example, Japan Laid-open Patent Application Publication No. 2011-231857 discloses a torque converter including a lock-up device of a normally closed type. When the torque converter is in a neutral state, the lock-up device is configured to be locked up (a lock-up-applied state). The torque converter includes a coil spring for urging the lock-up device to the lock-up-applied state. The coil spring presses a piston onto a cover, whereby the lock-up-applied state of the lock-up device is made.

To release the lock-up-applied state of the lock-up device in the torque converter described above, an oil pump is actuated to supply hydraulic oil to the torque converter, whereby the piston is moved against an urging force applied by the coil spring.

SUMMARY

It is desirable to reduce the size of the oil pump for supplying the hydraulic oil. Accordingly, it is an object of the claimed invention to provide a power transmission device that facilitates reduction in the size of an oil pump.

A power transmission device according to a first aspect includes a torque converter, a first oil pathway, a second oil pathway, and a switch device. The torque converter includes a lock-up device, an urging member, a cover, an impeller, a turbine, a first hydraulic chamber, and a second hydraulic chamber. The lock-up device includes a clutch part and a piston. The urging member urges the piston toward the clutch part. The first oil pathway is communicated with the first hydraulic chamber. The second oil pathway is communicated with the second hydraulic chamber. The switch device is configured to be switched between a first position and a second position. The switch device is switched to the first position to supply a hydraulic oil to the first hydraulic chamber through the first oil pathway. The switch device is switched to the second position to supply the hydraulic oil to the second hydraulic chamber through the second oil pathway. The piston is configured to press the clutch part when the hydraulic oil is supplied to an interior of the first hydraulic chamber. The piston is also configured to release pressing the clutch part when the hydraulic oil is supplied to an interior of the second hydraulic chamber.

According to this configuration, the urging member urges the piston toward the clutch part; hence, the lock-up device is being locked up in a neutral state. In other words, the lock-up device transmits a torque between the cover and the turbine in the neutral state. Additionally, when the hydraulic oil is supplied to the interior of the first hydraulic chamber, the piston is caused to press the clutch part. In other words, the piston is caused to press the clutch part not only by an urging force applied from the urging member but also by the pressure of the hydraulic oil in the interior of the first hydraulic chamber. Therefore, the urging force applied from the urging member can be reduced in magnitude. As a result, the hydraulic pressure, required for releasing the lock-up device from being locked up, can be reduced in magnitude. Because of this, the size of an oil pump can be reduced.

A power transmission device according to a second aspect relates to the power transmission device according to the first aspect and is configured as follows. The first hydraulic chamber is defined by the cover and the piston. The second hydraulic chamber is defined by the turbine and the piston.

A power transmission device according to a third aspect relates to the power transmission device according to the second aspect and is configured as follows. The clutch part is disposed between the piston and the turbine.

A power transmission device according to a fourth aspect relates to the power transmission device according to any of the first to third aspects and is configured as follows. The torque converter includes a communication hole causing the first and second hydraulic chambers to be communicated therethrough with each other.

A power transmission device according to a fifth aspect relates to the power transmission device according to any of the first to fourth aspects and further includes an oil pump, a pump motor, and a control part. The oil pump is configured to supply the hydraulic oil to the torque converter through either the first or second oil pathway. The pump motor is configured to drive the oil pump. The control part is configured to control the pump motor and the switch device. The control part includes a first lock-up-applying mode, a second lock-up-applying mode, and a lock-up-releasing mode. The control part executes the first lock-up-applying mode to stop actuating the pump motor. The control part executes the second lock-up-applying mode to actuate the pump motor and control and cause the switch device to be switched to the first position. The control part executes the lock-up-releasing mode to actuate the pump motor and control and cause the switch device to be switched to the second position.

A power transmission device according to a sixth aspect relates to the power transmission device according to the fifth aspect and further includes a temperature sensor. The temperature sensor detects a temperature of the hydraulic oil in the torque converter. The torque converter includes a communication hole causing the first and second hydraulic chambers to be communicated with therethrough each other. The control part is configured to execute the second lock-up-applying mode when determining that the temperature of the hydraulic oil detected by the temperature sensor is greater than or equal to a predetermined value.

A power transmission device according to a seventh aspect relates to the power transmission device according to any of the first to sixth aspects and further includes a drive motor and a branched oil pathway. The drive motor is configured to output a torque to the torque converter. The branched oil pathway is branched off from the first oil pathway and is configured to supply the hydraulic oil to the drive motor.

Overall, according to the claimed invention, reduced size of a hydraulic pump is facilitated.

DETAILED DESCRIPTION

A presently preferred embodiment of a power transmission device 100 in accordance with the claimed invention will be hereinafter explained with reference to the drawings. It should be noted that in the following explanation, the term "axial direction" refers to an extending direction of a rotational axis O of a torque converter 3. On the other hand, the term "circumferential direction" refers to a circumferential direction of an imaginary circle about the rotational axis O, whereas the term "radial direction" refers to a radial direction of the imaginary circle about the rotational axis O.

[Power Transmission Device]

Figure 1:
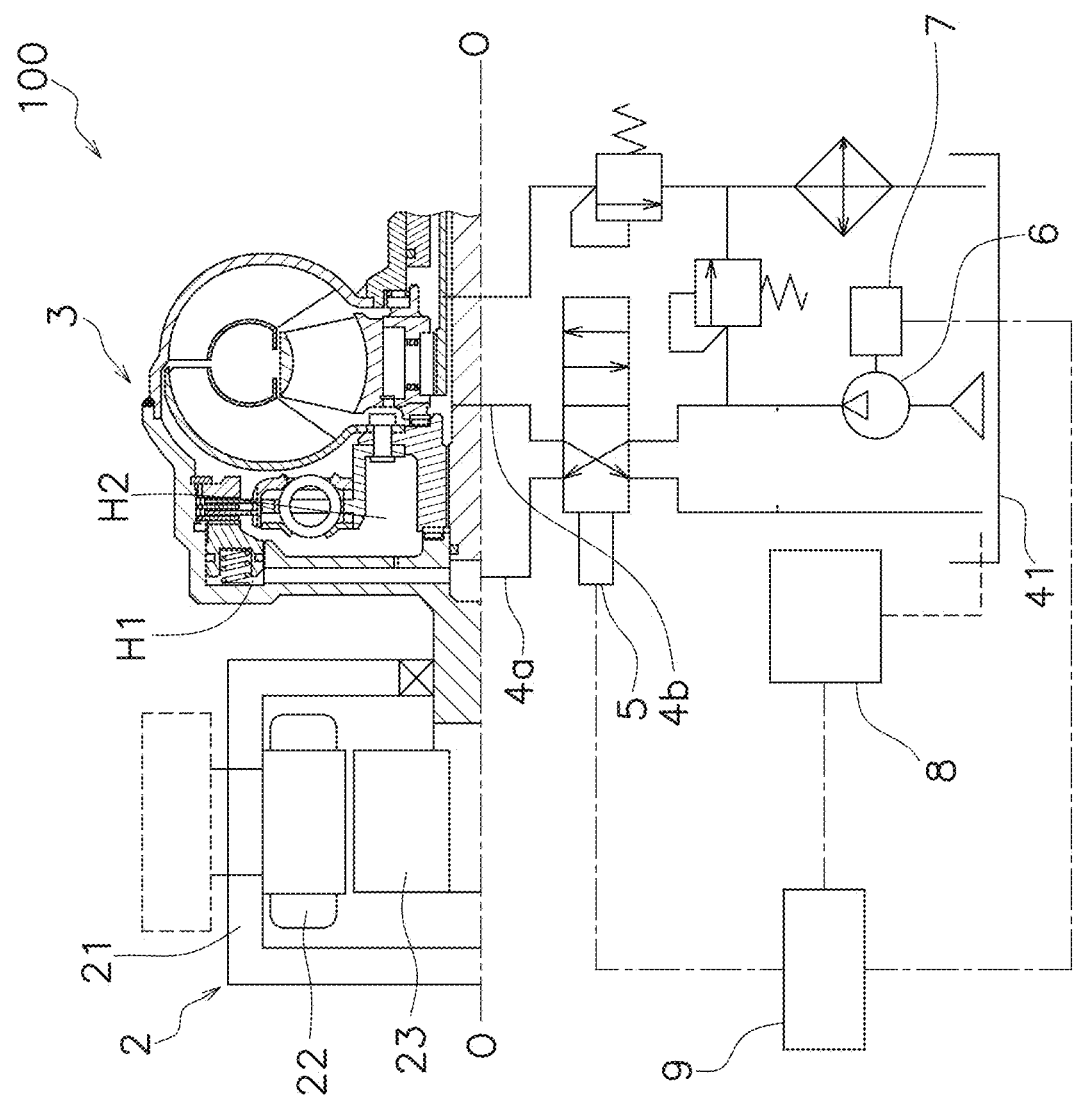
FIG. 1 is a schematic view of an embodiment of a power transmission device in accordance with the claimed invention.

As shown in FIG. 1, the power transmission device 100 includes a drive motor 2, the torque converter 3, a first oil pathway 4a, a second oil pathway 4b, a switch device 5, an oil pump 6, a pump motor 7, a temperature sensor 8, and a control part 9. The power transmission device 100 may be installed, for instance, in an electric car.

[Drive Motor]

The drive motor 2 functions as a drive source for the vehicle in which the power transmission device 100 is installed. The drive motor 2 in the illustrated embodiment is an electric motor. The drive motor 2 may, for instance, be a synchronous alternating-current motor. It should be noted that the vehicle in which the power transmission device 100 is installed includes the drive motor 2 as the only one drive source thereof. In other words, the vehicle, in which the power transmission device 100 is installed does not include an internal combustion engine as a drive source thereof. In the presently preferred embodiment, the vehicle does not include any internal combustion engine, but alternatively, it may include an internal combustion engine to be used for generating electricity.

The drive motor 2 includes a motor casing 21, a motor stator 22, and a rotor 23. In the presently preferred embodiment, the drive motor 2 is a so-called inner rotor motor. The drive motor 2 includes an inverter (omitted in the illustration) to control the rotational speed of the drive motor 2. The drive motor 2 is configured to output a torque to the torque converter 3.

The motor casing 21 is non-rotatable while being fixed, for example, to a body frame of the vehicle. The motor casing 21 accommodates the motor stator 22 and the rotor 23 in the interior thereof.

The motor stator 22 is fixed to the inner peripheral surface of the motor casing 21. The motor stator 22 is non-rotatable. The rotor 23 is rotated about the rotational axis O. The rotor 23 is disposed radially inside the motor stator 22. The motor stator 22 is disposed radially away from the rotor 23 at an interval.

[Torque Converter]

The torque converter 3 is disposed to be rotatable. The rotational axis O of the torque converter 3 is substantially matched with that of the drive motor 2. The torque converter 3 is a device to which the torque outputted from the drive motor 2 is transmitted. The torque converter 3 is configured to amplify the torque outputted from the drive motor 2. It should be noted that a reducer, etc., may be interposed between the drive motor 2 and the torque converter 3.

Figure 2:
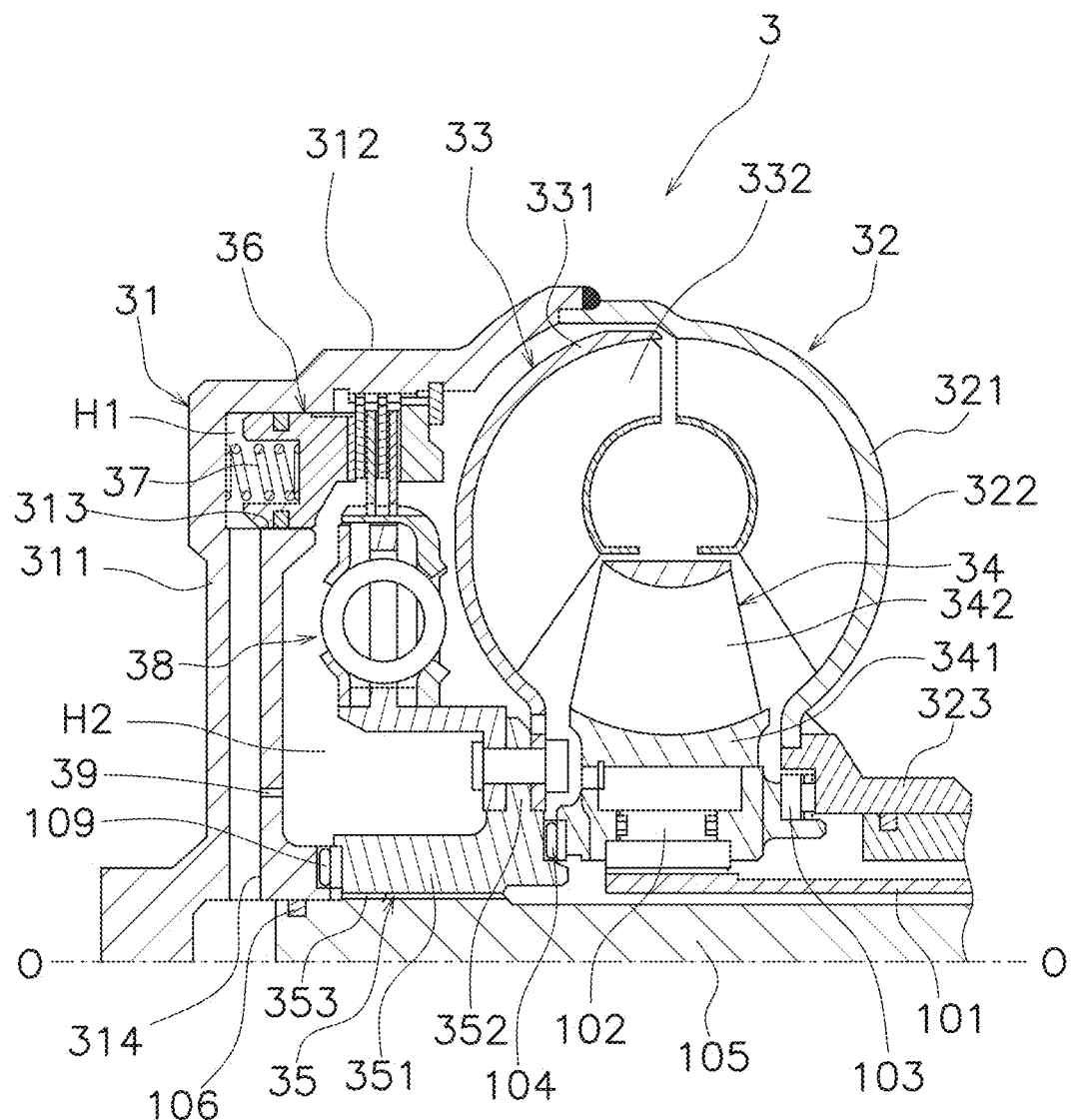
FIG. 2 is a cross-sectional view of an embodiment of a torque converter in accordance with the claimed invention.

FIG. 2 is a cross-sectional view of the torque converter 3. As shown in FIG. 2, the torque converter 3 includes a cover 31, an impeller 32, a turbine 33, a stator 34, an output hub 35, a lock-up device 36, a plurality of urging members 37, a damper device 38, and a communication hole 39. Additionally, the torque converter 3 includes a first hydraulic chamber H1 and a second hydraulic chamber H2. Hydraulic fluid is supplied to the interior of the torque converter 3. The hydraulic fluid may, for instance, be hydraulic oil.

<Cover>

The cover 31 is a component to which the torque outputted from the drive motor 2 is inputted. The cover 31 is rotated by the torque transmitted thereto from the drive motor 2. The cover 31 includes a first disc portion 311 and a first cylindrical portion 312. The first cylindrical portion 312 extends from the outer peripheral end of the first disc portion 311 in the axial direction. When described in detail, the first cylindrical portion 312 extends from the first disc portion 311 toward the impeller 32 in the axial direction. In other words, the first cylindrical portion 312 extends to a first side in the axial direction. A seal member 106 is disposed between the cover 31 and an output shaft 105. The seal member 106 may, for instance, be a seal ring made of resin.

Additionally, the cover 31 includes an accommodation portion 313 and a perforated portion 314. The accommodation portion 313 is a recess provided on the inner surface of the first disc portion 311, i.e., the surface facing the first side in the axial direction in the first disc portion 311. The accommodation portion 313 is made in the shape of an annulus extending in the circumferential direction. The accommodation portion 313 is opened toward the turbine 33. In other words, the accommodation portion 313 is opened to a space provided between the cover 31 and the turbine 33.

The perforated portion 314 extends inside the first disc portion 311 in the radial direction. The perforated portion 314 forms part of the first oil pathway 4a (to be described). The perforated portion 314 communicates with the accommodation portion 313. When described in detail, the perforated portion 314 communicates at the radially outer end (outer peripheral end) thereof with the accommodation portion 313.

<Impeller>

The impeller 32 is unitarily rotated with the cover 31. The impeller 32 is a component to which the torque transmitted from the drive motor 2 is inputted through the cover 31. The impeller 32 is fixed to the cover 31. When described in detail, the impeller 32 is fixed to the first cylindrical portion 312 of the cover 31.

The impeller 32 includes an impeller shell 321, a plurality of impeller blades 322, and an impeller hub 323. The impeller shell 321 may be fixed to the cover 31 by welding, for instance. The impeller blades 322 are fixed to the inner peripheral surface of the impeller shell 321. The impeller hub 323 may be fixed to the inner peripheral end of the impeller shell 321 by welding, etc.

<Turbine>

The turbine 33 is disposed in opposition to the impeller 32. When described in detail, the turbine 33 is opposed to the impeller 32 in the axial direction. The turbine 33 is a component to which the torque is transmitted from the impeller 32 through the hydraulic oil.

The turbine 33 includes a turbine shell 331 and a plurality of turbine blades 332. The turbine blades 332 may be fixed to the inner surface of the turbine shell 331 by brazing, etc.

<Stator>

The stator 34 is configured to regulate the flow of hydraulic oil returning from the turbine 33 to the impeller 32. The stator 34 is rotatable about the rotational axis O. For example, the stator 34 is supported by a stationary shaft 101 through a one-way clutch 102. It should be noted that the stationary shaft 101 is non-rotatable. The stator 34 is disposed axially between the impeller 32 and the turbine 33.

The one-way clutch 102 is disposed between the stationary shaft 101 and the stator 34. The one-way clutch 102 is configured to allow the stator 34 to rotate in a forward rotational direction. On the other hand, the one-way clutch 102 makes the stator 34 non-rotatable in a reverse rotational direction. The torque is transmitted from the impeller 32 to the turbine 33 while being amplified by the stator 34.

The stator 34 includes a stator carrier 341 having a disc shape and a plurality of stator blades 342 attached to the outer peripheral surface of the stator carrier 341. It should be noted that a first thrust bearing 103 is disposed between the stator 34 and the impeller 32, whereas a second thrust bearing 104 is disposed between the stator 34 and the output hub 35.

[Output Hub]

The output hub 35 is configured to output the torque transmitted thereto from the turbine 33 to the output shaft 105. The turbine 33 is attached to the output hub 35. When described in detail, the turbine shell 331 is attached to the output hub 35 through at least one rivet, etc. The output hub 35 is provided with a spline hole 353. The output shaft 105 is spline-coupled to the spline hole 353. A third thrust bearing 109 is disposed between the output hub 35 and the cover 31.

The output hub 35 includes a boss portion 351 and a flange portion 352. The boss portion 351 has a cylindrical shape and extends in the axial direction. The boss portion 351 is provided with the spline hole 353. The flange portion 352 extends radially outward from the outer peripheral surface of the boss portion 351. The flange portion 352 has an annular shape and extends in the circumferential direction. The turbine shell 331 is attached to the flange portion 352.

[Lock-Up Device]

When locked up (i.e., in the lock-up-applied state), the lock-up device 36 causes the impeller 32 and the turbine 33 to be directly coupled to each other. When described in detail, the lock-up device 36 causes the cover 31 and the turbine 33 to be directly coupled to each other. On the other hand, when released from being locked up (a lock-up-released state), the lock-up device 36 releases the impeller 32 and the turbine 33 from being directly coupled to each other. When described in detail, the lock-up device 36 releases the cover 31 and the turbine 33 from being directly coupled to each other.

Figure 3:
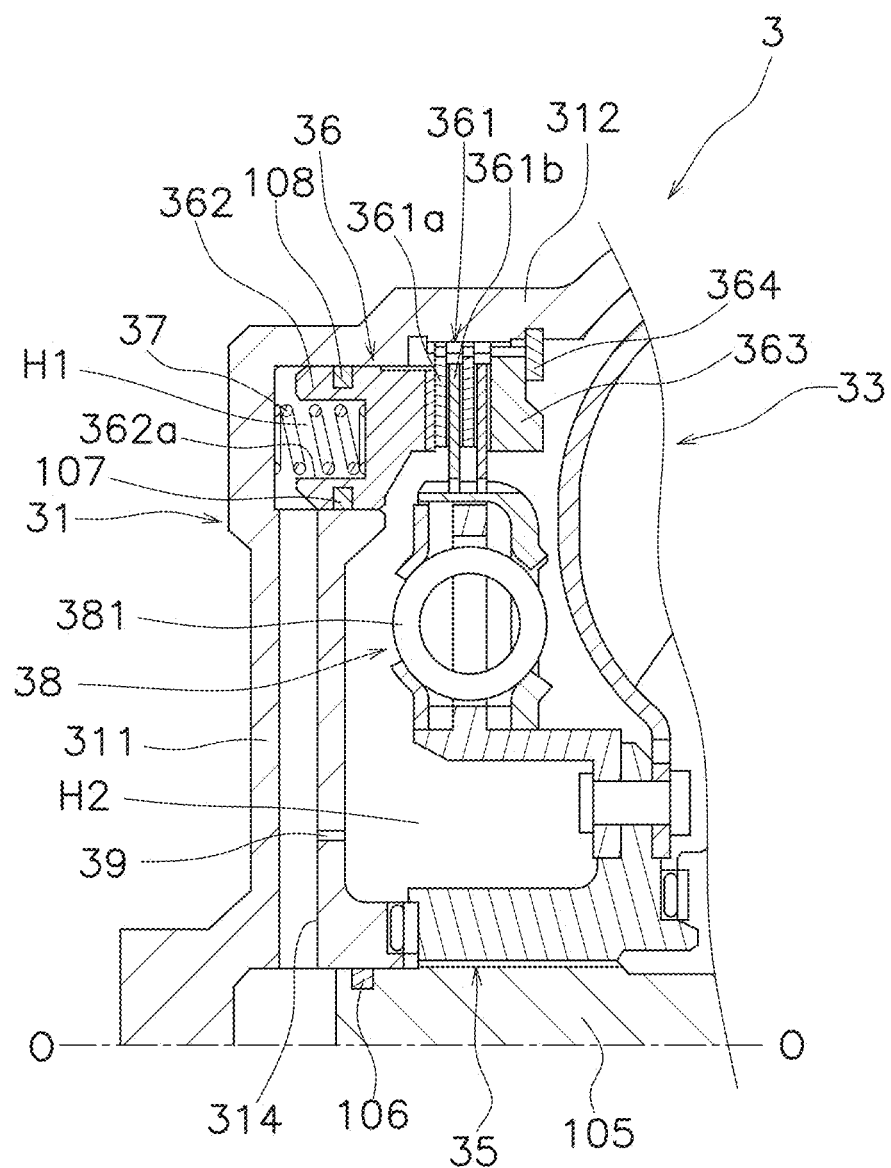
FIG. 3 is an enlarged cross-sectional view of a portion of the torque converter illustrated in FIG. 2.

FIG. 3 is an enlarged cross-sectional view of a portion of the torque converter 3. The lock-up device 36 includes a clutch part 361 and a piston 362.

The clutch part 361 can be turned to a clutch-on state and a clutch-off state. When the lock-up-applied state of the lock-up device 36 is made, this means that the clutch part 361 is turned to the clutch-on state. On the other hand, when the lock-up-released state of the lock-up device 36 is made, this means that the clutch part 361 is turned to the clutch-off state.

The clutch part 361 includes a plurality of first clutch discs 361a and a plurality of second clutch discs 361b. The first clutch discs 361a and the second clutch discs 361b are alternatingly disposed in the axial direction. A friction material is disposed between each adjacent pair of first and second clutch discs 361a and 361b. The friction material may be adhered to the first clutch disc 361a, or alternatively, to the second clutch disc 361b in each adjacent pair of first and second clutch discs 361a and 361b.

The first clutch discs 361a are attached to the first cylindrical portion 312 of the cover 31, while being movable in the axial direction. Additionally, the first clutch discs 361a are unitarily rotated with the first cylindrical portion 312.

The second clutch discs 361b are attached to either the turbine 33 or a member unitarily rotated with the turbine 33. It should be noted that in the presently preferred embodiment, the second clutch discs 361b are attached to the damper device 38. The second clutch discs 361b are attached to the damper device 38, while being movable in the axial direction. Additionally, the second clutch discs 361b are unitarily rotated with the damper device 38.

The piston 362 is disposed inside the accommodation portion 313 of the cover 31, while being movable in the axial direction. The piston 362 slides axially on an inner wall surface defining the accommodation portion 313. The piston 362 is made in the shape of an annulus extending in the circumferential direction. Seal members 107 and 108 are disposed between the piston 362 and the inner wall surface defining the accommodation portion 313. The seal members 107 and 108 may, for instance, be O-rings. The piston 362 is configured to be unitarily rotated with the cover 31. It should be noted that the piston 362 may be rotatable relative to the cover 31.

When the piston 362 is moved to the first side in the axial direction, i.e., when the piston 362 is moved toward the clutch part 361, the clutch part 361 is pressed by the piston 362, whereby the first clutch discs 361a and the second clutch discs 361b are engaged by friction with each other. As a result, the lock-up-applied state of the lock-up device 36 is made.

The lock-up device 36 includes a pressure-receiving member 363. The pressure-receiving member 363 is attached to the first cylindrical portion 312. The pressure-receiving member 363 is restricted from moving to the first side in the axial direction by a stopper ring 364. The clutch part 361 is disposed between the piston 362 and the pressure-receiving member 363. The clutch part 361 is axially sandwiched by the piston 362 and the pressure-receiving member 363.

[Urging Members]

The urging members 37 urge the piston 362 toward the clutch part 361. In other words, the urging members 37 urge the piston 362 to the first side in the axial direction. The urging members 37 may, for instance, be coil springs. The urging members 37 are disposed between the cover 31 and the piston 362 while being compressed therebetween. The urging members 37 are spaced apart from each other at intervals in the circumferential direction.

For example, the piston 362 includes a plurality of accommodation recesses 362a. The accommodation recesses 362a are spaced apart from each other at intervals in the circumferential direction. The accommodation recesses 362a are opened to a second side in the axial direction. The urging members 37 are disposed in the accommodation recesses 362a, respectively.

The piston 362 presses the clutch part 361 by the urging forces applied from the urging members 37. As a result, when the power transmission device 100 is in a neutral state without being actuated, the clutch part 361 is in the clutch-on state. In other words, when the oil pump 6 is not being actuated—and therefore the hydraulic oil is not being supplied to the interior of the torque converter 3—the clutch part 361 is in the clutch-on state. When the power transmission device 100 is in the neutral state, the lock-up-applied state of the lock-up device 36 is made. In other words, the lock-up device 36 is of a normally closed type.

[Damper Device]

The damper device 38 is disposed between the cover 31 and the turbine 33. When described in detail, the damper device 38 is disposed axially between the cover 31 and the turbine 33. The damper device 38 is configured to absorb fluctuations of the torque transmitted from the lock-up device 36 to the output hub 35.

The damper device 38 is coupled at an input side thereof to the lock-up device 36. On the other hand, the damper device 38 is coupled at an output side thereof to the output hub 35. The damper device 38 is configured to transmit the torque from the lock-up device 36 to the output hub 35. The damper device 38 elastically couples the lock-up device 36 and the output hub 35 therethrough. When described in detail, the damper device 38 includes at least one coil spring 381 and couples the lock-up device 36 and the output hub 35 through the one coil spring(s) 381.

[First and Second Hydraulic Chambers]

The first hydraulic chamber H1 is defined by the cover 31 and the piston 362. When described in detail, the first hydraulic chamber H1 is defined by the bottom surface of the accommodation portion 313, the inner wall surface of the accommodation portion 313, and the axially second-side surface of the piston 362.

When the hydraulic oil is supplied to the first hydraulic chamber H1, the piston 362 is moved to the first side in the axial direction. As a result, the piston 362 presses the clutch part 361. In other words, the lock-up-applied state of the lock-up device 36 is made not only by the urging forces applied from the urging members 37 but also by the pressure of the hydraulic oil.

The second hydraulic chamber H2 is defined by the turbine 33 and the piston 362. When described in detail, the second hydraulic chamber H2 is defined by the cover 31, the piston 362, the turbine 33, and the output hub 35. When the hydraulic oil is supplied to the second hydraulic chamber H2, the piston 362 is moved to the second side in the axial direction. As a result, the piston 362 is released from pressing the clutch part 361. In other words, the lock-up-released state of the lock-up device 36 is made.

The clutch part 361 is disposed inside the second hydraulic chamber H2. In other words, the clutch part 361 is disposed between the piston 362 and the turbine 33. Additionally, the damper device 38 is also disposed inside the second hydraulic chamber H2. The second hydraulic chamber H2 communicates with a space produced between the impeller 32 and the turbine 33.

[First and Second Oil Pathways]

As shown in FIG. 1, the first oil pathway 4a communicates with the first hydraulic chamber H1. When described in detail, the first oil pathway 4a causes an oil tank 41 and the first hydraulic chamber H1 to communicate therethrough with each other. It should be noted that as described above, the perforated portion 314 provided in the cover 31 forms part of the first oil pathway 4a.

The second oil pathway 4b communicates with the second hydraulic chamber H2. When described in detail, the second oil pathway 4b causes the oil tank 41 and the second hydraulic chamber H2 to communicate therethrough with each other. The second oil pathway 4b communicates with the second hydraulic chamber H2 through the space produced between the impeller 32 and the turbine 33.

The communication hole 39 causes the first and second hydraulic chambers H1 and H2 to communicate therethrough with each other. It should be noted that in the presently preferred embodiment, the communication hole 39 is provided in the first disc portion 311 of the cover 31. The communication hole 39 extends in the axial direction. The communication hole 39 causes the first oil pathway 4a and the second hydraulic chamber H2 to communicate therethrough with each other. The communication hole 39, together with the first oil pathway 4a, causes the first and second hydraulic chambers H1 and H2 to communicate therethrough with each other.

[Switch Device]

The switch device 5 is configured to be switched between a first position and a second position. The switch device 5 may, for instance, be a directional control valve. In FIG. 1, the switch device 5 is set in the first position. When the switch device 5 is switched to the first position, the hydraulic oil is supplied to the first hydraulic chamber H1 through the first oil pathway 4a. In other words, when the switch device 5 is switched to the first position, the hydraulic oil in the oil tank 4a is supplied therefrom to the first hydraulic chamber H1 through the first oil pathway 4a.

Figure 4:
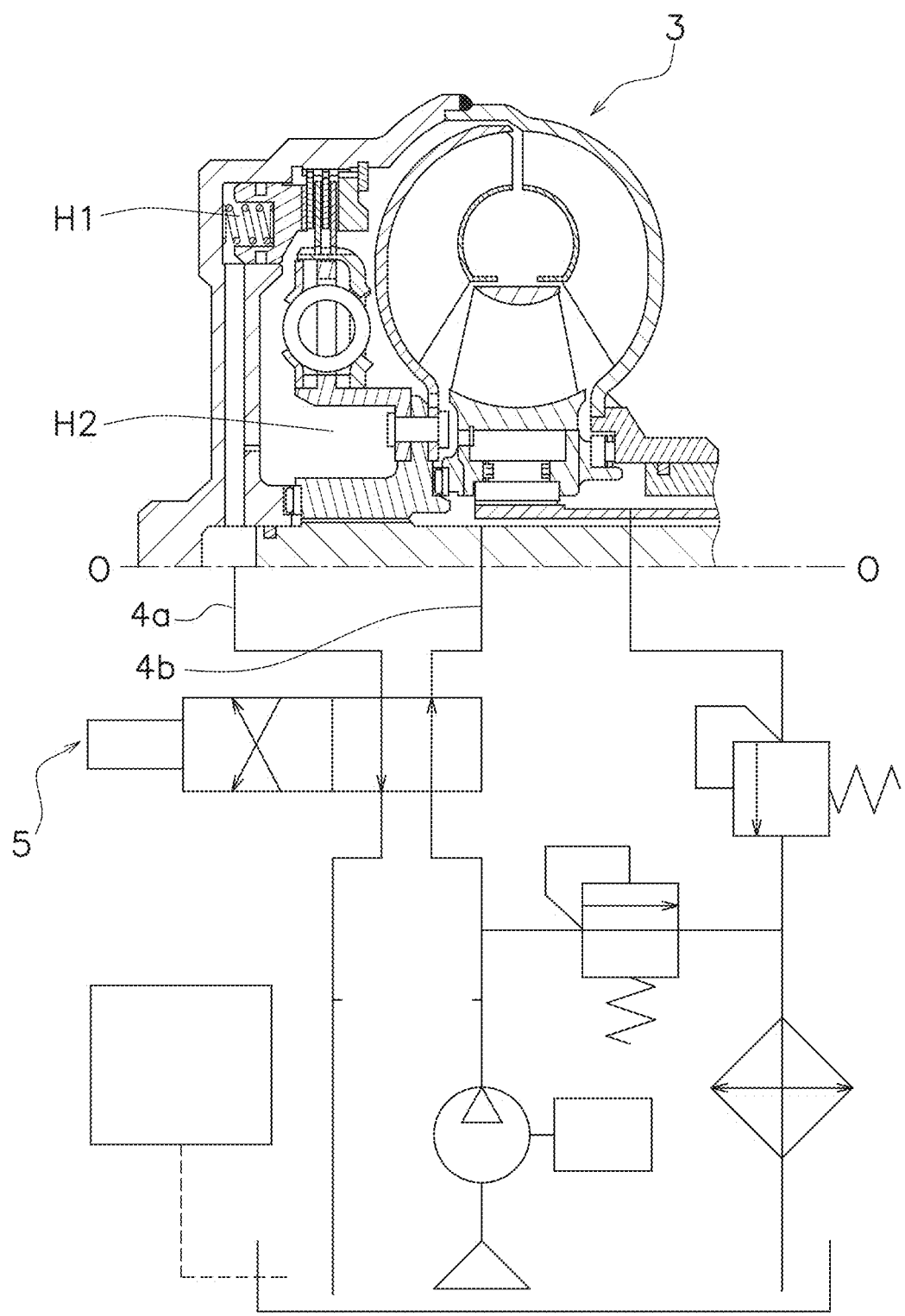
FIG. 4 is a schematic view of the power transmission device in which a hydraulic circuit has been switched.

In FIG. 4, the switch device 5 is set in the second position. When the switch device 5 is switched to the second position, the hydraulic oil is supplied to the second hydraulic chamber H2 through the second oil pathway 4b. In other words, when the switch device 5 is switched to the second position, the hydraulic oil in the oil tank 41 is supplied therefrom to the second hydraulic chamber H2 through the second oil pathway 4b.

[Oil Pump, Pump Motor, and Temperature Sensor]

As shown in FIG. 1, the oil pump 6 is configured to supply the hydraulic oil to the torque converter 3 through either the first oil pathway 4a or the second oil pathway 4b. The pump motor 7 is configured to drive the oil pump 6.

The temperature sensor 8 is configured to detect the temperature of the hydraulic oil in the torque converter 3. When described in detail, the temperature sensor 8 is configured to detect the temperature of the hydraulic oil inside the oil tank 41. It should be noted that the temperature sensor 8 may detect the temperature of the hydraulic oil flowing through an oil pathway from the torque converter 3 back to the oil tank 41. The temperature sensor 8 is configured to output information regarding the detected temperature of the hydraulic oil to the control part 9.

[Control Part]

The control part 9 is configured (e.g., programmed) to control the switch device 5 and the pump motor 7. The control part 9 is configured to control the switch device 5 and the pump motor 7 based on the speed of the vehicle, the opening degree of an accelerator, and the temperature of the hydraulic oil. It should be noted that the control part 9 obtains information regarding the vehicle speed from a vehicle speed sensor, obtains information regarding the accelerator opening degree from an accelerator position sensor, etc., and obtains information regarding the hydraulic oil temperature from the temperature sensor 8.

The control part 9 has a first lock-up-applying mode, a second lock-up-applying mode, and a lock-up-releasing mode. When executing the first lock-up-applying mode, the control part 9 stops actuating the pump motor 7. By thus stopping actuating the pump motor 7, only the urging forces applied from the urging members 37 act on the piston 362. As a result, the lock-up-applied state of the lock-up device 36 is made only by the urging forces applied from the urging members 37. In the first lock-up-applying mode, the torque converter 3 transmits the torque from the cover 31 to the turbine 33 through the lock-up device 36.

When executing the second lock-up-applying mode, the control part 9 controls and causes the switch device 5 to be switched to the first position while actuating the pump motor 7. Accordingly, the hydraulic oil is supplied to the first hydraulic chamber H1 through the first oil pathway 4*a*. As a result, not only the urging forces applied from the urging members 37 but also the pressure of the hydraulic oil supplied to the first hydraulic chamber H1 acts on the piston 362. Therefore, the lock-up-applied state of the lock-up device 36 is made by the urging forces applied from the urging members 37 and the hydraulic pressure inside the first hydraulic chamber H1.

The lock-up device 36 transmits a higher torque in the second lock-up-applying mode than in the first lock-up-applying mode. Additionally, in the second lock-up-applying mode, the hydraulic oil flows from the first hydraulic chamber H1 to the second hydraulic chamber H2 through the communication hole 39, whereby circulation of the hydraulic oil can be made. Because of this, cooling of the hydraulic oil can be made.

When executing the lock-up-releasing mode, as shown in FIG. 4, the control part 9 controls and causes the switch device 5 to be switched to the second position while actuating the pump motor 7. Accordingly, the hydraulic oil is supplied to the second hydraulic chamber H2 through the second oil pathway 4*b*. As a result, the pressure of the hydraulic oil supplied to the second hydraulic chamber H2 acts on the piston 362 against the urging forces applied from the urging members 37. Therefore, the piston 362 is moved away from the clutch part 361, whereby the clutch part 361 is turned to the clutch-off state. In other words, the lock-up-released state of the lock-up device 36 is made by the hydraulic pressure inside the second hydraulic chamber H2. Because of this, the torque converter 3 transmit the torque from the impeller 32 to the turbine 33 through the hydraulic oil.

When the vehicle is moving forward, the control part 9 determines which of the first and second lock-up-applying mode and the lock-up-releasing mode should be executed based on the vehicle speed and the accelerator opening degree. For example, the control part 9 executes the lock-up-releasing mode in a region A shown in FIG. 5. Specifically, in the region A shown in FIG. 5, the torque converter 3 transmits the torque from the impeller 32 to the turbine 33 through the hydraulic oil and thus exerts a torque-amplifying function.

Figure 5:
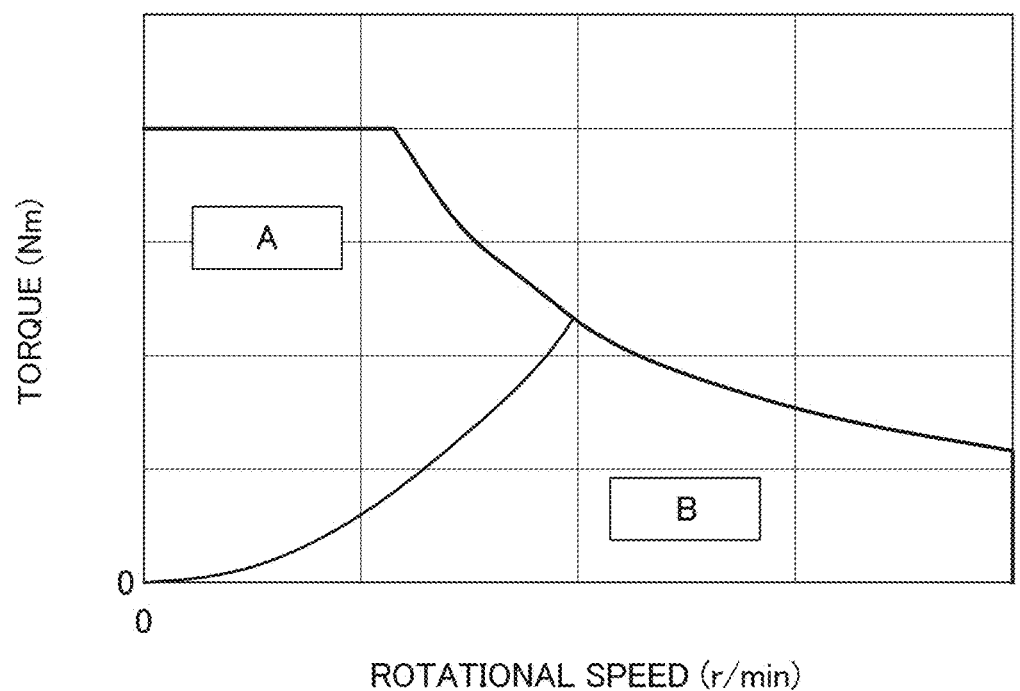
FIG. 5 is a chart showing regions in which a lock-up-applying mode and a lock-up-releasing mode are executed in forward traveling.

On the other hand, in a region B shown in FIG. 5, the control part 9 executes the first or second lock-up-applying mode. Specifically, in the region B shown in FIG. 5, the torque converter 3 transmits the torque from the cover 31 to the output hub 35 through the lock-up device 36. Normally, the control part 9 executes the first lock-up-applying mode. When then determining that the temperature detected by the temperature sensor 8 is greater than or equal to a predetermined value, the control part 9 executes the second lock-up-applying mode. It should be noted that when it is determined that the temperature detected by the temperature sensor 8 is less than the predetermined value, the control part 9 executes the first lock-up-applying mode.

Figure 6:
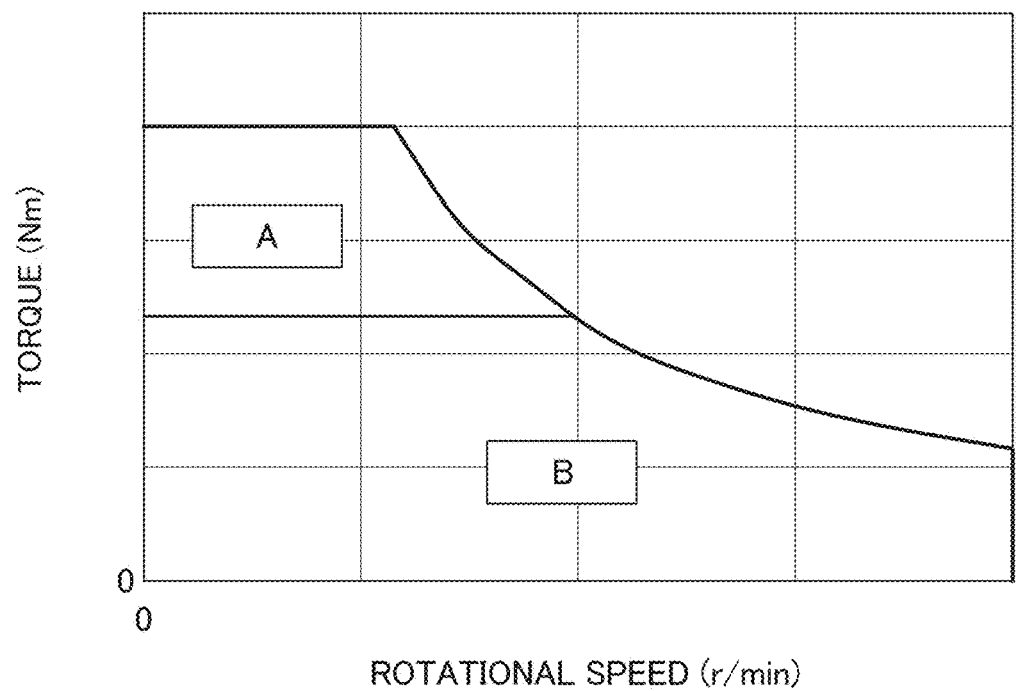
FIG. 6 is a chart showing regions in which a first lock-up-applying mode and a second lock-up-applying mode are executed in rearward traveling.

On the other hand, when the vehicle is travelling in a reverse direction, the control part 9 determines which of the first and second lock-up-applying modes should be executed based on the vehicle speed and the accelerator opening degree. For example, in a region A shown in FIG. 6, the control part 9 executes the second lock-up-applying mode. In other words, when the torque outputted from the drive motor 2 is greater than or equal to a predetermined value, the control part 9 executes the second lock-up-applying mode. On the other hand, in a region B shown in FIG. 6, the control part 9 executes the first lock-up-applying mode. It should be noted that when the vehicle is travelling in the reverse direction, the control part 9 does not execute the lock-up-releasing mode.

For example, a computer (e.g., microcomputer), including a CPU (Central Processing Unit), a ROM (Read Only Memory), and so forth, may be provided as the control part 9. The ROM stores programs for various computations. The CPU executes the programs stored in the ROM.

[Control Method]

Figure 7:
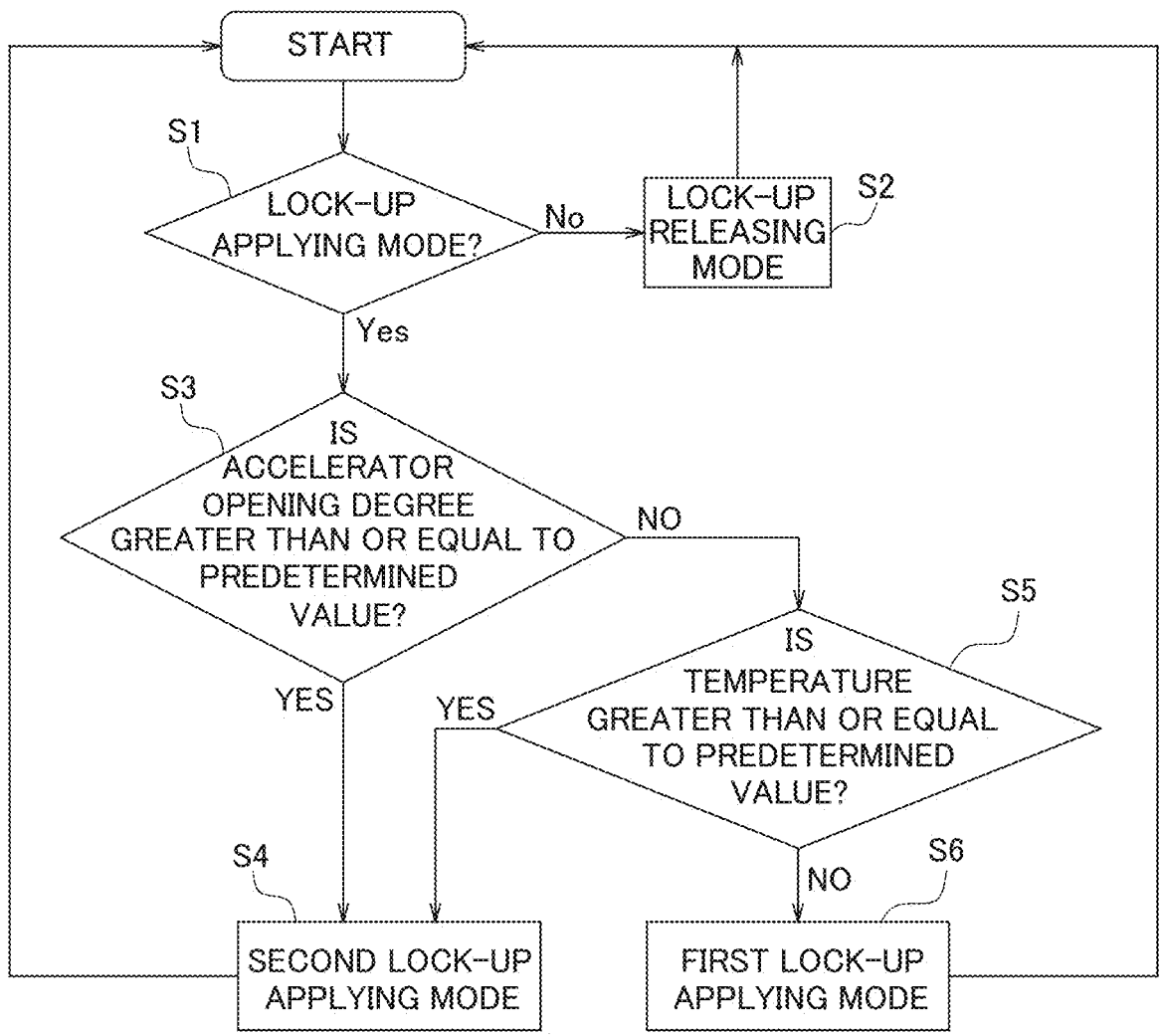
FIG. 7 is a flowchart showing a control method executed by a control part.

FIG. 7 is a flowchart exemplifying a control method executed by the control part 9. The control method executed by the control part 9 when the vehicle is travelling forward will be hereinafter explained with reference to FIG. 7.

First, the control part 9 determines whether or not the first or second lock-up-applying mode should be executed based on the vehicle speed and the accelerator opening degree (step S1). When described in detail, the control part 9 has a map representing relations between modes executed by the control part 9 and both the vehicle speed and the accelerator opening degree. Then, the control part 9 determines whether or not the first or second lock-up-applying mode should be executed based on the map. When it is determined that the first or second lock-up-applying mode should not be executed (NO in step S1), the control part 9 executes the lock-up-releasing mode (step S2).

When it is determined that the first or second lock-up-applying mode should be executed (YES in step S1), the control part 9 next determines whether or not the accelerator opening degree is greater than or equal to the predetermined value (step S3). When it is determined that the accelerator opening degree is greater than or equal to the predetermined value (YES in step S3), the control part 9 executes the second lock-up-applying mode (step S4). In other words, the control part 9 controls and causes the switch device 5 to be switched to the first position, while actuating the pump motor 7.

On the other hand, when it is determined that the accelerator opening degree is less than the predetermined value (NO in step S3), the control part 9 determines whether or not the hydraulic oil temperature is greater than or equal to the predetermined value (step S5). When it is determined that the hydraulic oil temperature is greater than or equal to the predetermined value (YES in step S5), the control part 9 executes the processing in step S4. On the other hand, when it is determined that the hydraulic oil temperature is less than the predetermined value (NO in step S5), the control part 9 executes the first lock-up-applying mode (step S6). In other words, the control part 9 stops the pump motor 7.

[Modifications]

One preferred embodiment of the claimed invention has been explained above. However, the claimed invention is not limited to the above, and a variety of changes can be made without departing from the scope of the claimed invention. It should be noted that, for the most part, respective modifications to be described are applicable simultaneously.

Figure 8:
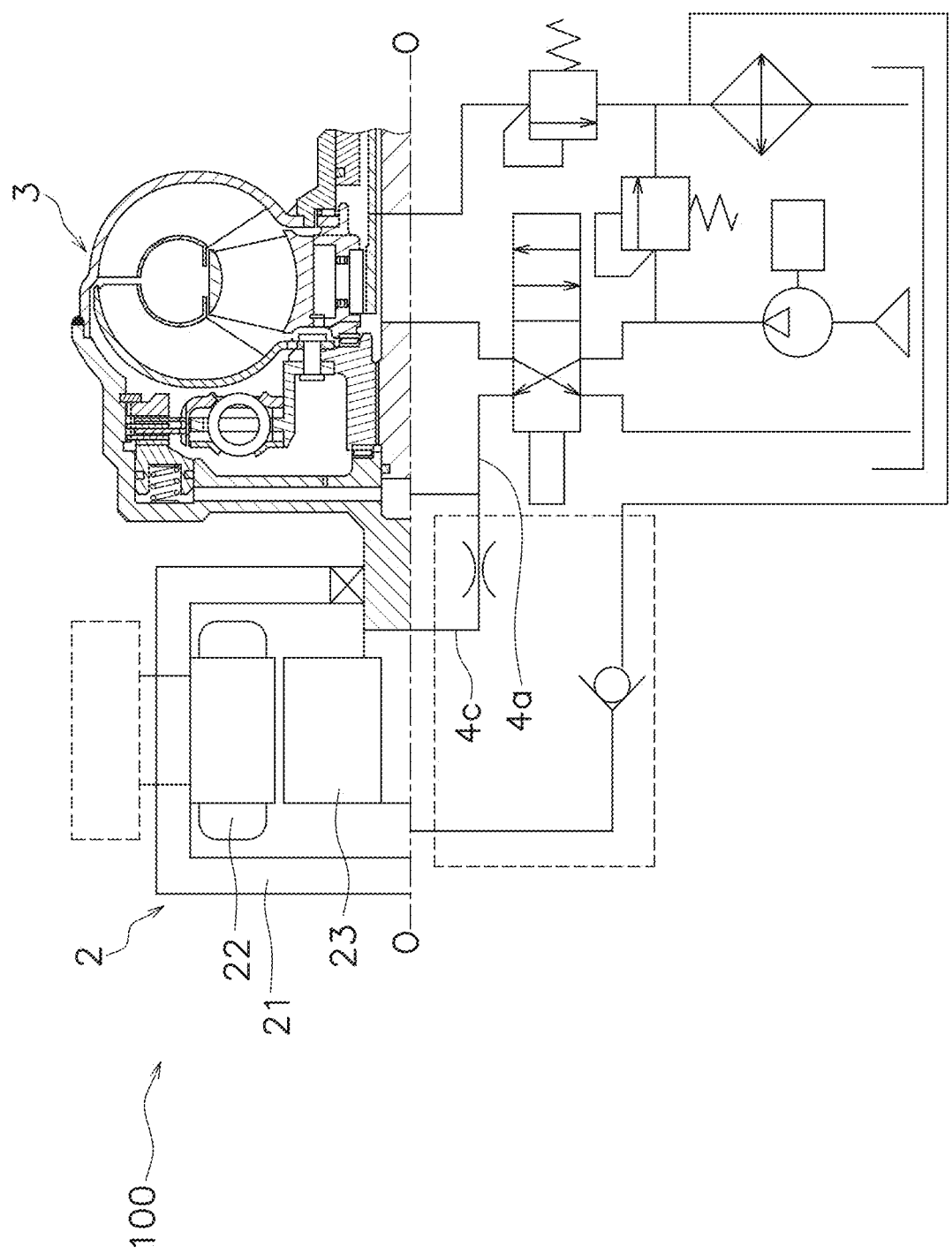
FIG. 8 is a schematic view of a power transmission device according to a modification.

(a) As shown in FIG. 8, the power transmission device 100 may further include a branched oil pathway 4c. The branched oil pathway 4c is branched off from the first oil pathway 4a. The branched oil pathway 4c is configured to supply the hydraulic oil to the drive motor 2. For example, the branched oil pathway 4c is configured to supply the hydraulic oil to the interior of the motor casing 21 of the drive motor 2.

(b) In the presently preferred embodiment described above, the piston 362 is accommodated in the accommodation portion 313 of the cover 31; however, the piston 362 is not limited to this configuration. For example, the piston 362 may be configured to partition off the space produced between the first disc portion 311 of the cover 31 and the turbine 33. In other words, the piston 362 may be made in the shape of a disc including an opening in the middle thereof. In that case, for instance, the piston 362 is slid on the output hub 35 in the axial direction.

(c) In the presently preferred embodiment described above, the clutch part 361 is disposed on the first side of the piston 362 in the axial direction; however, the lock-up device 36 is not limited to this configuration. For example, the clutch part 361 may be disposed on the second side of the piston 362 in the axial direction. In that case, the first hydraulic chamber H1 corresponds to a space produced between the piston 362 and the turbine 33, whereas the second hydraulic chamber H2 corresponds to a space produced between the cover 31 and the piston 362. Additionally, the urging members 37 urge the piston 362 to the second side in the axial direction.

(d) In the presently preferred embodiment described above, the communication hole 39 is provided in the cover 31; however, the communication hole 39 is not limited to this configuration. For example, the communication hole 39 may be provided in the piston 362. In that case, the communication hole 39 causes the first and second hydraulic chambers H1 and H2 to directly communicate with each other without any intervening member other than the communication hole 39.

LIST OF REFERENCE NUMERALS

2: Drive motor, 3: Torque converter, 31: Cover, 32: Impeller, 33: Turbine, 36: Lock-up device, 361: Clutch part, 362: Piston, 37: Urging member, 39: Communication hole, 4a: First oil pathway, 4b: Second oil pathway, 4c: Branched oil pathway, 5: Switch device, 6: Oil pump, 7: Pump motor, 8: Temperature sensor, 9: Control part, 100: Power transmission device, H1: First hydraulic chamber, H2: Second hydraulic chamber

The invention claimed is:

1. A power transmission device, comprising:
a torque converter including a lock-up device, an urging member, a cover, an impeller, a turbine, a first hydraulic chamber, and a second hydraulic chamber, the lock-up device including a clutch part and a piston, the urging member urging the piston toward the clutch part;
a first oil pathway in communication with the first hydraulic chamber;
a second oil pathway in communication with the second hydraulic chamber; and
a switch device configured to be switched between a first position and a second position, the switch device being switched to the first position to supply a hydraulic oil to the first hydraulic chamber through the first oil pathway, the switch device being switched to the second position to supply the hydraulic oil to the second hydraulic chamber through the second oil pathway, wherein
the piston is configured to press the clutch part when the hydraulic oil is supplied to an interior of the first hydraulic chamber, and the piston is configured to release pressing the clutch part when the hydraulic oil is supplied to an interior of the second hydraulic chamber.

2. The power transmission device according to claim 1, wherein the first hydraulic chamber is defined by the cover and the piston and the second hydraulic chamber is defined by the turbine and the piston.

3. The power transmission device according to claim 2, wherein the clutch part is disposed between the piston and the turbine.

4. The power transmission device according to claim 1, wherein the torque converter includes a communication hole through which the first and second hydraulic chambers communicate with each other.

5. A power transmission device, comprising:
a torque converter including a lock-up device, an urging member, a cover, an impeller, a turbine, a first hydraulic chamber, and a second hydraulic chamber, the lock-up device including a clutch part and a piston, the urging member urging the piston toward the clutch part;
a first oil pathway in communication with the first hydraulic chamber;
a second oil pathway in communication with the second hydraulic chamber;
a switch device configured to be switched between a first position and a second position, the switch device being switched to the first position to supply a hydraulic oil to the first hydraulic chamber through the first oil pathway, the switch device being switched to the second position to supply the hydraulic oil to the second hydraulic chamber through the second oil pathway, the piston being configured to press the clutch part when the hydraulic oil is supplied to an interior of the first hydraulic chamber, and the piston is configured to release pressing the clutch part when the hydraulic oil is supplied to an interior of the second hydraulic chamber;
an oil pump configured to supply the hydraulic oil to the torque converter through either the first or the second oil pathway;
a pump motor configured to drive the oil pump; and
a control part configured to control the pump motor and the switch device, wherein
the control part includes a first lock-up-applying mode, a second lock-up-applying mode, and a lock-up-releasing mode, the control part executing the first lock-up-applying mode to stop actuating the pump motor, the control part executing the second lock-up-applying mode to actuate the pump motor and control and cause the switch device to be switched to the first position, the control part executing the lock-up-releasing mode to actuate the pump motor and control and cause the switch device to be switched to the second position.

6. The power transmission device according to claim 5, further comprising a temperature sensor that detects a temperature of the hydraulic oil in the torque converter, wherein the torque converter includes a communication hole through which the first and second hydraulic chambers communicate with each other, and the control part is configured to execute the second lock-up-applying mode when it is determined that the temperature of the hydraulic oil detected by the temperature sensor is greater than or equal to a predetermined value.

7. The power transmission device according to claim 5, wherein the cover includes a perforated portion forming a part of an oil pathway that communicates with the first hydraulic chamber.

8. The power transmission device according to claim 7, wherein the cover includes a communication hole that causes the oil pathway and the second hydraulic chamber to communicate.

9. A power transmission device, comprising:

a torque converter including a lock-up device, an urging member, a cover, an impeller, a turbine, a first hydraulic chamber, and a second hydraulic chamber, the lock-up device including a clutch part and a piston, the urging member urging the piston toward the clutch part;

a first oil pathway in communication with the first hydraulic chamber;

a second oil pathway in communication with the second hydraulic chamber;

a switch device configured to be switched between a first position and a second position, the switch device being switched to the first position to supply a hydraulic oil to the first hydraulic chamber through the first oil pathway, the switch device being switched to the second position to supply the hydraulic oil to the second hydraulic chamber through the second oil pathway, the piston being configured to press the clutch part when the hydraulic oil is supplied to an interior of the first hydraulic chamber, and the piston is configured to release pressing the clutch part when the hydraulic oil is supplied to an interior of the second hydraulic chamber;

a drive motor configured to output a torque to the torque converter; and a branched oil pathway branched off from the first oil pathway, the branched oil pathway configured to supply the hydraulic oil to the drive motor.

10. The power transmission device according to claim 9, wherein the cover includes a perforated portion forming a part of an oil pathway that communicates with the first hydraulic chamber.

11. The power transmission device according to claim 10, wherein the cover includes a communication hole that causes the oil pathway and the second hydraulic chamber to communicate.

12. The power transmission device according to claim 1, wherein the cover includes a perforated portion forming a part of an oil pathway that communicates with the first hydraulic chamber.

13. The power transmission device according to claim 12, wherein the cover includes a communication hole that causes the oil pathway and the second hydraulic chamber to communicate.

* * * * *